UNITED STATES PATENT OFFICE 3,776,954
Patented Dec. 4, 1973

3,776,954
PROCESS FOR THE PRODUCTION OF THIOPHOSGENE
Hans-Dieter Rupp, Erlenbach, and Gerhard Meyer and Helmut Mägerlein, Obernburg, Germany, assignors to Akzo N.V., Arnhem, Netherlands
No Drawing. Filed July 24, 1972, Ser. No. 274,582
Int. Cl. C07c *153/01*
U.S. Cl. 260—543        14 Claims

ABSTRACT OF THE DISCLOSURE

A catalytic process for the production of thiophosgene by reduction of trichloromethane sulfenyl chloride with hydrogen sulfide at elevated temperatures and in the presence of at least one sulfide of the metals potassium, silver, barium, zinc, cadmium, lanthanum, tin, lead, vanadium, manganese or rhenium or at least one chloride of the metals chromium and magnesium, the catalyst being in an essentially water-free form. High yields of thiophosgene are obtained, and the process is especially adapted to be carried out in a continuous manner. Thiophosgene is known to be useful as an intermediate in the syntheses of many organic compounds.

---

According to the oldest known processes, thiophosgene has been prepared by reduction of trichloromethane sulfenyl chloride, by means of a number of reducing agents such as silver powder, tin with hydrochloric acid, tin chloride, iron with hydrochloric acid, iron with acetic acid, copper powder or hydrogen sulfide. Among, these processes, the best results have been obtained by using tin with hydrochloric acid as the reducing agent. See, for example, Dyson, Organ. Syntheses, vol. 6, pp. 86–91. However, this process is not suitable for a technical or commercial production of thiophosgene. The price of zinc is much too high and one obtains relatively slight yields of only 50 to 60%.

Another known process is one in which trichloromethane sulfenyl chloride is reacted at elevated temperatures with those hydrocarbons which easily give off hydrogen or whose hydrogen is at least partly replaceable by chlorine atoms. See German Pat. No. 853,162. In this process, the most favorable results are achieved by the use of tetralin. The process is not economical due to the high cost of the hydrocarbons. Moreover, it has the disadvantage that decomposition and side reactions of the trichloromethane sulfenyl chloride are favored by the necessarily high reaction temperatures such that yields of only about 80% are achieved.

According to a similar known process, trichloromethane sulfenyl chloride is reacted in the presence of Friedel-Crafts catalysts with an aromatic hydrocarbon having a ring-attached hydrogen which is easily substitutable by a chlorine atom, the reaction being carried out at temperatures of between 75° C. and 250° C. See U.S. Pat. No. 2,668,853. As the hydrocarbon, one can use benzene, its homologs or derivatives such as xylenes, chlorobenzenes or the like. On account of the difficulty utilizable chlorohydrocarbon mixture accruing in this process, it is also uneconomical, and besides the yield likewise amounts to only about 80% of theory.

It is further known to carry out the reduction of the trichloromethane sulfenyl chloride by means of hydrogen (German Pat. No. 873,836). In this case, the trichloromethane sulfenyl chloride and an excess of hydrogen are introduced into a reaction tube charged with packing or filler material or a catalyst carrier material at temperatures in the range of 300 to 400° C. This process would be profitable only if it were to be carried out as a recycle process. However, because of the additional separation steps for recovery of unreacted reaction components in this recycle process, it becomes very complicated and costly. Moreover, at these high reaction temperatures, considerable amounts of the trichloromethane sulfenyl chloride are thermally split into carbon tetrachloride and sulfur.

Two other processes are further known for the production of thiophosgene by reaction of trichloromethane sulfenyl chloride with diethylphosphite (Russian Pat. No. 105,336) or with white phosphorus (U.S. Pat. No. 3,150,-176). Although the yields in these processes are higher, e.g. about 85% or 91% of theory, as compared to the previously described processes, a technical or commercial production of thiophosgene still is not feasible or practical because of the high cost of the diethylphosphite or the white phosphorus.

The use of sulfur dioxide as the reducing agent for the preparation of thiophosgene from trichloromethane sulfenyl chloride is also known (French Pat. No. 1,152,827), but in this case the yields obtained are only 50 to 60% of theory.

According to a more recent process, thiophosgene can be obtained by reduction of trichloromethane sulfenyl chloride with sulfur dioxide or hydrogen sulfide in the presence of a two phase system of water and an organic solvent as the solvent medium and also in the presence of iodide ions as the catalyst, as disclosed in Czechoslovakian Pat. No. 103,963. If one uses sulfur dioxide as the reducing agent, thiophosgene can be produced by this process on a large industrial scale because the yields in this case amount to 92% of theory. The reaction proceeds according to the equation:

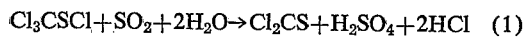

$$Cl_3CSCl + SO_2 + 2H_2O \rightarrow Cl_2CS + H_2SO_4 + 2HCl \quad (1)$$

The aqueous phase with sulfuric acid and hydrochloric acid as byproducts must be discarded because it is too expensive to be worked up and recovered. Also, the recovery of thiophosgene from the organc phase requires an expensive distillation. On the other hand, if one attempts to use hydrogen sulfide as the reducing agent in this process, there is obtained a yield of only 75% of theory.

Hydrogen sulfide is available in large amounts in the chemical industry, e.g. in the production of carbon disulfide, so as to be obtainable at a reasonable price as the reducing agent. However, prior processes for the production of thiophosgene indicate that good results in terms of reactivity and yields are not to be achieved with hydrogen sulfide.

It is a primary object of the present invention to provide an industrial scale process for the production of thiophosgene by the reduction of trichloromethane sulfenyl chloride with hydrogen sulfide, using catalytic conditions to operate at relatively low temperatures while achieving very high yields.

It has now been found, in accordance with the invention, that one can achieve this object and a number of accompanying advantages in the production of thiophosgene if the reduction of trichloromethane sulfenyl chloride with hydrogen sulfide is carried out at a temperature of from about 120° C. to 180° C. and in the presence of an essentially water-free catalyst which is a compound selected from the group consisting of the sulfides of potassium, silver, barium, zinc, cadmium, lanthanum, tin, lead, vanadium, manganese and rhenium or the chlorides of chromium and magnesium. The resultion reaction is preferably carried out at a temperature of about 130° C. to 160° C. and is ideally suited for continuous operation on a large commercial scale.

In this catalytic reduction reaction, the trichloromethane sulfenyl chloride reacts with the hydrogen sulfide at elevated temperatures to form thiophosgene substantially according to the following equation:

$$Cl_3CSCl + H_2S \rightarrow Cl_2CS + 2HCl + S \quad (2)$$

Hydrogen chloride and sulfur thus ocur as additional reaction products. Besides this main reaction, two other side reactions also take place to form bis-(trichloromethyl)-trisulfide and carbon disulfide according to the following equations:

$$2Cl_3CSCl + H_2S \rightarrow Cl_3CSSSCCl_3 + 2HCl \quad (3)$$

$$Cl_3CSCl + 2H_2S \rightarrow CS_2 + 4HCl + S \quad (4)$$

The reaction of trichloromethane sulfenyl chloride and hydrogen chloride in contact with the water-free catalysts of the invention proceeds unusually rapidly so that it is surprisingly possible to carry out this reaction at temperatures above 130° C. without leading to the decomposition of trichloromethane sulfenyl chloride into carbon tetrachloride and sulfur according to the equation:

$$Cl_3CSCl \rightarrow CCl_4 + S \quad (5)$$

The reduction reaction is preferably carried out in the range of temperatures of about 130° C. to 160° C. because practically no bis-(trichloromethyl)-trisulfide is formed under these conditions. Also, within this preferred temperature range, the formation of carbon disulfide in accordance with Equation 4 is largely repressed so that that the thiophosgene is obtained in very high yields. Increasing amounts of carbon disulfide as a byproduct occur only at temperatures above 160° C. in accordance with Equation 4.

The trichloromethane sulfenyl chloride and hydrogen sulfide are preferably brought together for reaction in the process of the invention in a stoichiometric equivalent amount, i.e. in a molar ratio of approximately 1:1. An excess of hydorgen sulfide favors the formation of carbon disulfide while an excess of trichloromethane sulfenyl chloride is uneconomical because unreacted amounts thereof must be separated and recycled or at least recovered.

It is absolutely essential to employ the catalysts of the invention in water-free form because the presence of water acts unfavorably on the selectivity of the reaction. Thus, water must be excluded from the reaction carried out in accordance with the invention, but especially from the metal compounds introduced and maintained in a catalytic reaction zone. Good results are thus assured by conducting the process under essentially anhydrous or water-free conditions. In any large scale continuous process, care should be exercised to avoid introducing water into the reaction system.

In general, it has also been found that one can employ one or more metal sulfides as a catalyst with the exception of copper sulfide and of sulfides of the metals of Groups V-A and VIII of the Periodic Table of the elements. However, it is desirable to use at least one sulfide of the metals potassium, silver, barium, zinc, cadmium, lanthanum, thallium, tin, lead, vanadium, manganese and rhenium Especially good results are obtained with one or more of the metal sulfides illustrated in the examples below.

Instead of these metal sulfides, one can also use other metal salts and oxides which are converted into the sulfides under the influence of hydrogen sulfide at the reaction conditions. As examples of such other suitable metal compounds, there can be mentioned manganese chloride, manganese sulfate, silver chloride, silver sulfate, lanthanum chloride, tin(II) chloride, lead chloride, silver oxide and lead oxide. For the reasons given above, it will be apparent that these salts and oxides should also be introduced in water-free form, i.e. preferably as anhydrous compounds. Because these other metal compounds have only a slight catalytic effect as compared to the corresponding sulfides, they first become fully active only after a sufficient amount has been converted into the sulfide catalyst.

Magnesium chloride and chromium(III) chloride represent the preferred chloride catalysts of the invention, and it should be noted that these metal chlorides are not converted into sulfides under the reaction conditions. On the other hand, other salts and oxides of both of these metals can be used where they are converted into magnesium chloride and chromium(III) chloride under the reaction conditions. For example, under the influence of the hydrogen chloride being produced in the reaction, magnesium oxide is gradually converted into magnesium chloride which then functions as the active catalyst. Thus, such other salts or oxides are useful only in their water-free form and only to the extent that a sufficient amount is converted into the active chloride catalyst.

The individual catalysts or mixtures of one or more of the catalytic compounds can be charged directly into the reaction zone or preferably after first being supported on a conventional carrier material or inert support, e.g. Raschig rings or the like.

The reaction mixture from the process of the invention consists of a liquid portion containing sulfur, unreacted trichloromethane sulfenyl chloride and small amounts of the bis-(trichloromethyl)-trisulfide formed according to Equation 3, as well as of a gaseous mixture consisting essentially of thiophosgene, hydrogen chloride and small amounts of carbon disulfide. This gas mixture can be worked up in a conventional manner, e.g. by fractional condensation so as to separate and recover the desired thiophosgene product. A thiophosgene of high purity is obtained very easily in this manner.

The process of the invention can be carried out either discontinuously as a batch process or preferably continuously in a tubular reactor containing the essential catalyst. In this preferred continuous process, the catalyst is preferably used in the form of the inert packing material, e.g. Raschig rings, on which the catalyst has been pre-coated. The tubular reaction zone is then maintained at a temperature of 120–180° C., preferably 130–160° C., while continuously introducing the trichloromethane sulfenyl chloride and hydrogen sulfide in preferably about equimolar amounts.

It has been proven that the best results are achieved in the continuous process of the invention if the two initial reactants are reacted with each other in cocurrent flow through the reaction zone in contact with the catalyst. In particular, about equimolar amounts of trichloromethane sulfenyl chloride and hydrogen sulfide are preferably conveyed into the upper part of a vertical reaction tube filled with the catalyst while withdrawing at the bottom end of the reaction tube both the gaseous mixture of thiophosgene, hydrogen chloride and carbon disulfide and also the liquid mixture of sulfur, some unreacted trichloromethane sulfenyl chloride and usually a slight amount of the byproduct bis-(trichloromethyl)-trisulfide. The unreacted trichloromethane sulfenyl chloride as a still useful reactant material can be distilled off in common together with the bis-(trichloromethyl)trisulfide from the sulfur in the liquid mixture, whereby the bis-(trichloromethyl)-trisulfide also reacts to form additional thiophosgene in accordance with the following equation:

$$Cl_3CSSSCCl_3 + H_2S \rightarrow 2Cl_2CS + 2HCl + 2S \quad (6)$$

In comparison to most known processes, the production of thiophosgene according to the present invention is characterized by its economy and industrial efficiency, especially in view of the fact that the very inexpensive hydrogen sulfide can be used as the reducing agent and that the yields of thiophosgene are quite high. In contrast to the Czech. Pat. No. 103,963, wherein the use of sulfur dioxide provides a 92% yield, the present process is distinguished by its relative simplicity; the prior process is more complicated and expensive insofar as a solvent is required which must be recycled together with the catalyst employed therewith. Moreover, a portion of the catalyst in this prior process is lost with the impurities present in the reaction mixture and must therefor be replaced. The required amount of catalyst thus rises according to the purity of the initial materials and the solvent being used, and consequently it must be analytically determined.

The process of the invention is further illustrated by but not limited to the following examples wherein different catalysts are used in accordance with the invention under substantially the same conditions for purposes of comparison.

EXAMPLES

There was used a double jacketed glass reaction tube of one meter in length and a 15 mm. inner diameter filled with Raschig rings which had been coated in each different example with the catalyst as noted in the table below. With the aid of a thermostat control, the reaction tube was heated to a temperature of 135° C. and maintained at this temperature for each experiment. Through two feed lines at the head of the reaction tube, there was continuously introduced by means of metering pumps 17.75 g./hr. (0.95 mol/hr.) of trichloromethane sulfenyl chloride and 3.25 g./hr. (0.95 mol/hr.) of hydrogen sulfide so as to pass in cocurrent flow through the reaction tube. The sulfur being formed was collected at the bottom end of the reaction tube in a small flask heated to 135° C. This sulfur contained only a trivial amount of trichloromethane sulfenyl chloride and bis-(trichloromethyl)-trisulfide. The gaseous reaction products were likewise withdrawn at the bottom of the reaction tube, condensed in a cooled condenser and then collected in a wash bottle cooled to 0° C. and loaded with semi-concentrated hydrochloric acid. After an initial running period of 5 hours, a constant reaction rate was achieved in the reaction tube. Thereafter, the organic phase being formed in the wash bottle was drawn off in the amount of 10.75 grams per hour and worked up by distillation. The results are given in the table as the selectivity of thiophosgene formation, with reference to the reacted trichloromethane sulfenyl chloride.

| Example number | Catalyst | Selectivity (percent) |
| --- | --- | --- |
| 1 | $Ag_2S$ | 93 |
| 2 | BaS | 97.5 |
| 3 | CdS | 87.2 |
| 4 | $La_2S_3$ | 95 |
| 5 | SnS | 99 |
| 6 | PbS | 99 |
| 7 | $V_2S_5$ | 92.3 |
| 8 | MnS | 95 |
| 9 | $MgCl_2$ | 93 |
| 10 | $CrCl_3$ | 88 |

In these examples, the total amount of trichloromethane sulfenyl chloride reacted was about 99.6% so that the selectivity is just about equal to the yield of thiophosgene.

When carried out in a pilot plant or a larger industrial scale, the small amounts of unreacted trichloromethane sulfenyl chloride are easily recycled without any appreciable build-up of impurities. Excellent yields of thiophosgene are thus obtained in very pure form over relatively long periods of operation.

The invention is hereby claimed as follows:

1. A process for the production of thiophosgene which comprises reducing trichloromethane sulfenyl chloride with hydrogen sulfide at a temperature of from about 120° C. to 180° C. in the presence of at least one water-free catalyst selected from the group consisting of the sulfides of potassium, silver, barium, zinc, cadmium, lanthanum, thallium, tin, lead, vanadium, manganese and rhenium and the chlorides of chromium and magnesium.

2. A process as claimed in claim 1 wherein the reduction reaction is carried out at a temperature of about 130° to 160° C.

3. A process as claimed is claim 1 wherein the catalyst is at least one metal sulfide selected from the group consisting of $Ag_2S$, BaS, CdS, $La_2S_3$, SnS, PbS, $V_2S_5$ and MnS.

4. A process as claimed in claim 3 wherein the reduction reaction is carried out at a temperature of about 130° to 160° C.

5. A process as claimed in claim 1 wherein the catalyst is at least one metal chloride selected from the group consisting of $MgCl_2$ and $CrCl_3$.

6. A process as claimed in claim 5 wherein the reduction reaction is carried out at a temperature of about 130° to 160° C.

7. A process as claimed in claim 1 wherein reactants trichloromethane sulfenyl chloride and hydrogen sulfide are conducted continuously through a tubular reaction zone filled with said water-free catalyst, and thiophosgene is separated from the reaction product withdrawn continuously from said reaction zone.

8. A process as claimed in claim 7 which includes the steps of introducing approximately stoichiometric equivalent amounts of trichloromethane sulfenyl chloride and hydrogen sulfide into the upper part of a tubular reaction zone filled with said water-free catalyst, withdrawing from the lower end of said reaction zone a gaseous mixture of thiophosgene, carbon disulfide and hydrogen chloride together with a liquid mixture of sulfur, bis-(trichloromethyl)-trisulfide and unreacted trichloromethane sulfenyl chloride, separating and recycling to the reaction zone the bis-(trichloromethyl)-trisulfide and the trichloromethane sulfenyl chloride, and separating and recovering thiophosgene from the gaseous mixture.

9. A process as claimed in claim 8 wherein said tubular reaction zone is maintained at a temperature of about 130° C. to 160° C.

10. A process as claimed in claim 2 wherein the catalyst consists essentially of SnS.

11. A process as claimed in claim 2 wherein said catalyst consists essentially of PbS.

12. A process as claimed in claim 2 wherein said catalyst consists essentially of BaS.

13. A process as claimed in claim 2 wherein said catalyst consists essentially of MnS.

14. A process as claimed in claim 2 wherein said catalyst consists essentially of $MgCl_2$.

References Cited
UNITED STATES PATENTS
2,668,853   2/1954   Orwoll _____ 260—543 R LORRAINE A. WEINBERGER, Primary Examiner R. D. KELLY, Assistant Examiner

UNITED STATES PATENT OFFICE
CERTIFICATE OF CORRECTION

Patent No. 3,776,954      Dated December 4, 1973

Inventor(s) Hans-Dieter Rupp et al

It is certified that error appears in the above-identified patent and that said Letters Patent are hereby corrected as shown below:

Column 1, line 60, "difficulty" should read -- difficultly --

Column 2, line 39, "organc" should read -- organic --.

Column 2, line 67, "resultion" should read -- reduction --

Column 3, line 5, "ocur" should read -- occur --.

Column 3, line 29, delete "that".

Column 3, line 37, "hydorgen" should read -- hydrogen --.

Column 4, line 22, insert -- resulting -- after "mixture".

Col. 1, please insert

Claims priority - German application P 21 38 174.8 and German application P 21 38 175.9, both filed July 30, 1971.

Signed and sealed this 26th day of November 1974.

(SEAL)
Attest:

McCOY M. GIBSON JR.
Attesting Officer

C. MARSHALL DANN
Commissioner of Patents